Figure 2:
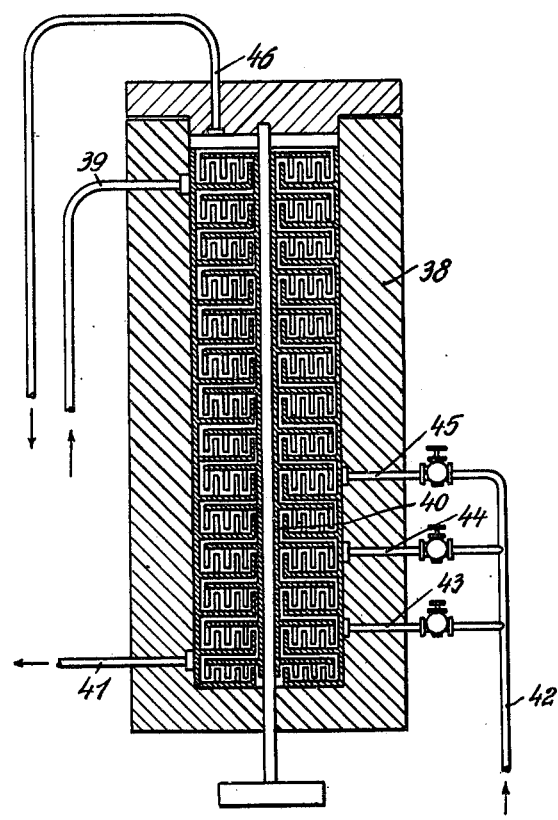

July 27, 1937. T. W. PFIRRMANN 2,088,214
PROCESS OF HYDROGENATING CARBONACEOUS MATERIALS
Filed March 19, 1934 2 Sheets-Sheet 2

Inventor:
Theodor Wilhelm Pfirrmann
by Kilishaein
Atty.

July 27, 1937. T. W. PFIRRMANN 2,088,214
PROCESS OF HYDROGENATING CARBONACEOUS MATERIALS
Filed March 19, 1934 2 Sheets-Sheet 1
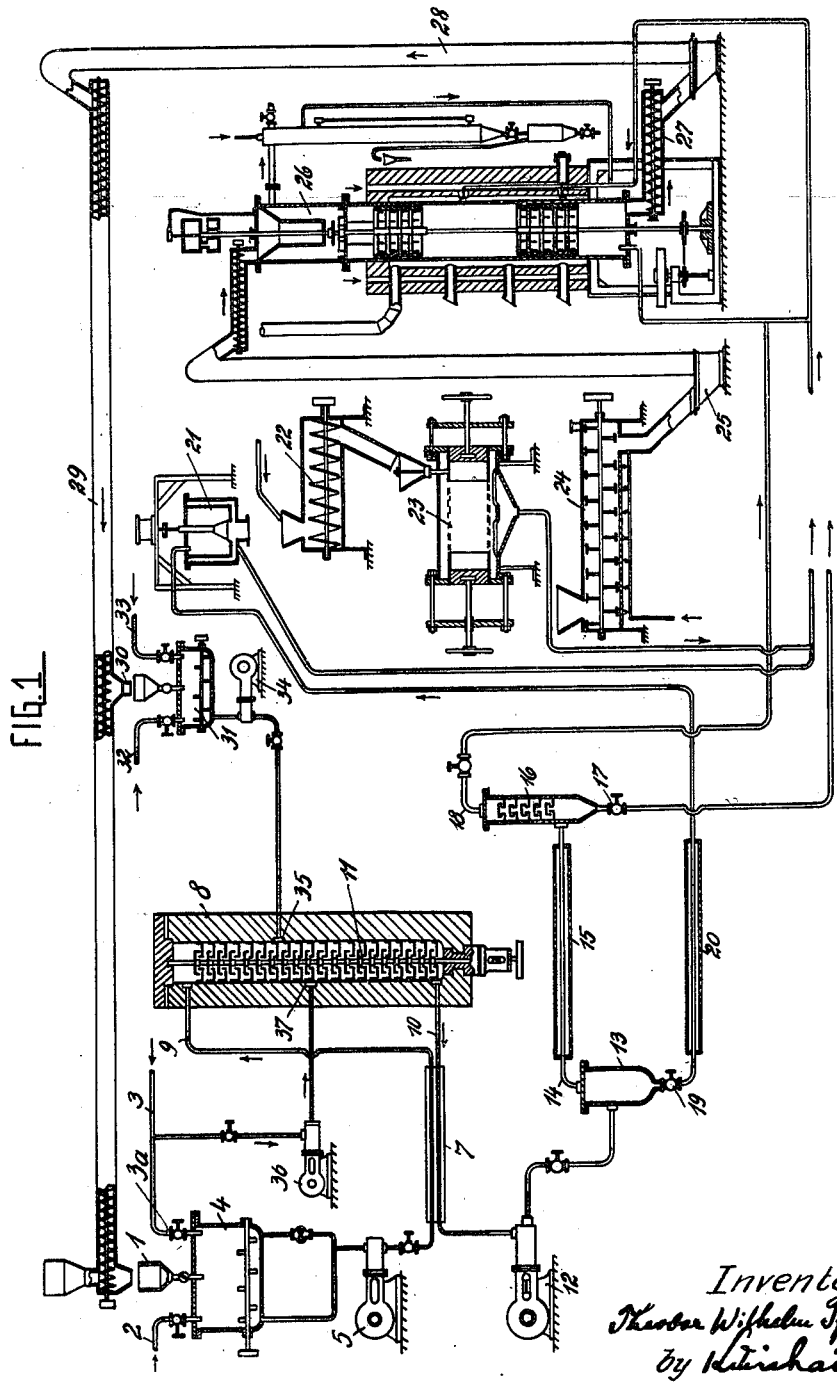

Patented July 27, 1937

2,088,214

UNITED STATES PATENT OFFICE 2,088,214

PROCESS OF HYDROGENATING CARBONACEOUS MATERIALS

Theodor Wilhelm Pfirrmann, Castrop-Rauxel, Germany, assignor to Friedrich Uhde Ingenieur-Buro, Dortmund, Germany Application March 19, 1934, Serial No. 716,422
In Germany March 20, 1933

3 Claims. (Cl. 196—53)

My invention relates to the treatment of carbonaceous substances for the purpose of converting them into products of higher value. It particularly refers to the decomposition of carbonaceous substances with simultaneous hydrogenation of the products resulting in such decomposition, and it is an object of my invention to improve the conditions under which the reactions involved occur in such manner as to obtain the highest degree of hydrogenation and/or yield of hydrogenated products with greatest saving in starting and reacting materials and in chemical and mechanical energy.

The invention of the present application is closely allied to those of my copending applications, Serial Nos. 716,423 and 716,424. The present application relates particularly to various methods of controlling the course of the destructive hydrogenation process wherein nascent hydrogen is generated in the reaction zone by the reaction of a finely divided metal with water. Serial No. 716,423 is directed to a process wherein water is preheated before being introduced into the reaction zone to temperatures and pressures substantially approaching critical conditions, while Serial No. 716,423 is directed more particularly to the apparatus employed in the process of my invention.

Other objects of this invention will appear as this specification proceeds.

As is well known to those skilled in the art, if carbonaceous substances, such as solid or liquid bituminous material, or their distillation, extraction, or conversion products, are subjected to decomposition and hydrogenation with hydrogen under pressure, two reactions occur simultaneously, one being the decomposition reaction in which the larger molecules of the substances are broken down under formation of smaller molecules of an unsaturated character, the other being the combination of smaller unsaturated molecules with hydrogen to saturate them.

It is further known that if the combination with hydrogen does not proceed fast enough, decomposition of the smaller molecules initially formed may occur, resulting in the formation of undesirable quantities of gas and carbon. In order to avoid the formation of these undesirable products hydrogenation catalysts have been added and a quantity of hydrogen largely exceeding the amount theoretically required for the combination has been forced from an extraneous source into the reaction zone and kept recirculating therethrough.

If instead of forcing compressed molecular hydrogen into the reaction zone for the purpose of effecting hydrogen combination, use is made of nascent hydrogen produced in situ within the reaction zone by the action of water at an elevated temperature and under high pressure on a suitable substance, for instance finely divided metals such as iron or zinc, a third reaction, namely hydrogen generation will be involved with the reactions of decomposition and of hydrogen combination.

It has been proposed in the U. S. Patent No. 1,936,819 to Bayer, for example, to convert carbonaceous materials to form lower boiling hydrocarbon oils wherein such a material is heated in a closed reaction zone in the presence of water and of at least one finely divided metal capable of reacting with said water with the production of nascent hydrogen in situ; the said reaction zone being heated to temperatures above the critical temperature of water, thereby liberating hydrogen from the water and building up within the reaction zone a self-generated pressure adequate to hydrogenate a substantial proportion of said carbonaceous materials and sufficient to prevent substantial vaporization of said carbonaceous material.

I have found that the production of nascent hydrogen in a process such as that of Bayer should be effected in such manner that a sufficient quantity of nascent hydrogen is present to saturate the decomposition products at all points of and during their formation. However, in view of the transitional character of nascent (atomic) hydrogen, it is advisable as a rule to generate only substantially the stoichiometric (theoretically required) quantity, since all hydrogen particles not combined immediately after their formation will combine to form molecular hydrogen, which latter is far less reactive and cannot be utilized with the same economy.

Nascent hydrogen combines very quickly with the molecular fragments resulting in the decomposition of the initial carbonaceous substances and in consequence thereof the nascent hydrogen is utilized efficiently, and a great many tests have shown that it is possible to combine up to 90% or more of the nascent hydrogen developed in the reaction zone with the starting material to be hydrogenated.

In order to attain this object, it is, however, necessary to operate under predetermined conditions of reaction. According to the present invention the aforementioned three reactions, i. e. the generation of nascent hydrogen, the decomposition of hydrocarbons or other carbonaceous starting material and the combination of the decomposition products with hydrogen are influenced in a manner whereby the relative time and location (place) of occurrence in other words the relative progress of said reactions is controlled in accordance with the particular conditions of each individual case and with the character of the starting material or of the products to be obtained in such manner as to create and maintain constant the conditions under which a maximum yield of valuable products is obtained.

The three reactions may be influenced and controlled in different ways and by different means.

The generation of nascent hydrogen may be expedited, for example, by introducing into the reaction zone water in excess of the quantity theoretically required for interaction with the finely divided metal such as iron or zinc.

*Example 1*

In the conversion of a residue with an initial boiling point of about 300° C., resulting from the distillation of crude oil from Wietze, Hanover, Germany, into lower boiling hydrocarbons by hydrogenation, I may, for example, admix 100 parts by weight of the starting material with 80 parts by weight of finely divided metal (for instance iron) and 50 parts by weight of water, although the equation

$$2Fe + 3H_2O = Fe_2O_3 + 3H_2$$

would require only 35 parts of water. The excess of water appears to prevent at the same time a decomposition of the oil beyond a certain desired degree.

The velocity of generation of the nascent hydrogen can be influenced also by the addition, to the water, of agents promoting the reaction of the water with metal. I prefer using readily soluble salts, such as salts of ammonium and of alkali metals, preferably the halides, carbonates or hydroxides of the alkali metals, the chlorides of alkaline earth metals, for instance calcium, magnesium or aluminum, or mixed salts containing cerium chloride and particularly metal salts which further the reaction between water and iron as well as the hydrogenation reaction proper. I have found such compounds to be the chlorides or the sulfates of manganese, chromium, molybdenum, cobalt and nickel. The agents used in my process need not be immune to sulphur poisoning.

*Example 2*

Instead of mixing 100 parts of the residue mentioned above with 80 parts of iron and 50 parts of water I may replace the water by an aqueous solution containing 2% of manganese chloride and 3% of magnesium chloride, or 3% of ammonium chloride and 2% of molybdenum pentachloride, or 3% of ammonium chloride and 2% of molybdenum oxychloride.

Compounds of such metals as have an electrochemical affinity to halogen atoms higher, and are therefore less noble, than the metals used for the generation of nascent hydrogen, are particularly suitable for influencing the velocity of hydrogen generation. Such metal compounds do not materially react with the metal serving for the generation of nascent hydrogen and may consequently be re-used in the process.

While the formation of nascent hydrogen can thus be tuned (controlled) in accordance with the decomposition and hydrogenation combination reactions, a similar tuning of the decomposition reaction itself is advisable in many cases.

I have found that the metals or mixtures of metals suitable for producing nascent hydrogen, such as for instance iron, zinc, copper, nickel, tin, manganese, and aluminum also further to a large or small extent the decomposition of the carbonaceous materials. In order, now, to prevent the formation of undesirable quantities of gaseous reaction products, I have found it advisable to use mixtures or alloys of two or more of these metals or mixtures or alloys of a metal of this group with some other metal, such as for instance molybdenum, chromium, tungsten, nickel, uranium and cerium (and under circumstances also an amalgam) which influences the decomposition of the oil in a different direction. Thus, for instance, finely comminuted iron furthers the formation of lighter hydrocarbons, such as methane etc.; however, if instead of iron a mixture of iron and tin or of iron, tin and nickel is used, the formation of such gases is considerably reduced.

An undesirable degree of decomposition of the carbonaceous materials undergoing conversion can further be avoided or reduced by employing one or more of the metals mentioned above together with an increase of pressure in the reaction zone.

Thus, the use of specific metals or mixtures of such metals at increased pressure is a further means of attaining a mutual correlation or synchronization of the several reactions.

The use of high pressures, such as, for example, a pressure of 500 atms. or more does not cause any difficulties or high costs, since in this process no mechanical compression of extraneous gases is needed. All that is required is to force liquids and solids into the reaction system under pressure.

The increase in the yield of liquid products due to increased pressure is illustrated by the following example:

*Example 3*

100 parts of Wietze topped crude of 300° C. initial boiling point is subjected to treatment with 80 parts of finely comminuted metallic iron and 50 parts of an aqueous solution containing 4% of magnesium chloride. If the pressure in the reaction vessel is maintained at about 100 atms. and the temperature at about 450° C., the total yield of liquid products will be about 80% by volume of the charging stock.

If the same mixture is treated at about 450° C., under 290 atms. pressure, the total yield of liquid products will amount to 99.4% by volume. The amount of 200° C. E. P. gasoline will be about the same in both cases. Thus, the undesirable formation of gases has been considerably reduced by the increased pressure.

A further means for checking the velocity of decomposition of the carbonaceous materials and for reducing the formation of undesirable gaseous products consists in the use of a spongy iron which has been produced at a low temperature without sintering and which may contain carbon. Iron, which is the metal preferably used, and especially iron in its true metallic state obtainable by comminuting compact iron metal favors the formation of lighter hydrocarbons such as methane, ethane, etc. If in the example above described the mechanically comminuted metallic iron is replaced by non-sintered spongy iron obtained by reduction with gases at low temperature (about 800° C.), the undesirable formation of gases is lowered by about 25% in either case. The use of a spongy iron of the character indicated above simultaneously acts towards increasing the velocity of formation of the nascent hydrogen, since spongy iron obtained by gas reduction at low temperature reacts with water far more quickly than compact finely comminuted iron.

The use of such spongy iron offers the further advantage that a higher output is obtainable per unit of reaction space. Furthermore, sintered metal, although having been comminuted as far as possible, causes mechanical difficulties by its abrasion action on the pumps, valves etc. Sintered metal also is particularly disadvantageous in a continuous operation, since it tends to rapidly settle from a mixture in which it is contained, thereby frequently causing the clogging of pipes. In contradistinction thereto the unsintered spongy iron does not exert any substantial abrasion action, nor does it lead to the frequent clogging of pipes.

Instead of spongy iron as such, I may also use a spongy mixture of iron and other substances for the generation of nascent hydrogen, for instance tin, nickel and carbon and I have found that in such a case the formation of undesirable gas is further reduced. A mixture containing for instance about 65% Fe, about 15% Sn, about 5% Ni, the remainder being carbon, oxygen and a small amount of sulphur, has been found to be particularly efficient.

In order to recover the metal, such as iron, in the unsintered spongy form by reduction of the ferric oxide formed in the process, this reduction must be carried through at low temperature (below 1000° C.) preferably with the aid of solid or gaseous reducing agents, such as carbon, hydrocarbons, carbon monoxide, hydrogen, methane, ethane, etc. or gas mixtures such as coke oven gas, residual gas from hydrocarbon conversion processes, natural gas, cracked natural gas or water gas. If a gas is used for reduction, I prefer adding carbon to the metal since I am thus enabled to prevent any sintering even if the temperature should temporarily rise above about 900° C. This may possibly be due to the primary formation of unstable carbides, which upon decomposition impart to the metal a particularly soft structure. The metal oxide such as ferric oxide is reduced preferably with the aid of gases rich in carbon or splitting off carbon, such as methane. In this case the reduction may occur for instance according to the equation

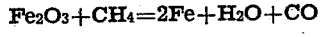

$$Fe_2O_3 + CH_4 = 2Fe + H_2O + CO$$

Reduction with the aid of methane or other gases splitting off carbon involves the particular advantage that, owing to the liberation of relatively large quantities of hydrogen, the reduction can be carried through with low gas velocities whereby the formation of undesirable dust may be substantially avoided.

If gases are employed as reducing agents, I have found it advantageous to simultaneously add carbon to the metallic substance to be reduced, since sintering is avoided thereby even if the temperature should temporarily rise above 900° C. I believe this to be due to the primary formation of unstable carbides whose decomposition may be responsible for the particular soft structure of the resulting reduced material. On the other hand, if mixtures of metals, for example a mixture of spongy iron with tin has been used in the hydrogenation treatment instead of spongy iron alone, the reduction of the metal oxides may still be operated in such manner that the spongy structure of the iron in the mixture is again obtained. Tin is particularly suitably for raising the temperature at which iron starts sintering, so that a reduction oxide mixture containing oxides of tin or the like may be effected at a temperature above 800° C.

In carrying out this phase of my invention, the ferric oxide formed in the hydrogenation reaction may for example, be reduced at 800° C. in an exteriorly heated furnace, wherein the material to be treated is passed by means of scrapers over a number of superimposed trays and acted upon with coke oven gas containing approximately 55% $H_2$, 26% $CH_4$, 2% heavy hydrocarbons, 6% CO, 5% $N_2$ and 3% $CO_2$. The spongy iron obtained by this treatment may contain 80% of spongy iron and 7% of FeO, the balance being other metals and carbon.

The reduction of the iron oxides may also be effected in such manner that instead of metallic iron only an iron carbide mixed with free carbon is produced, by reducing at lower temperature (about 450–550° C.) with CO or gases containing same. The formation of the carbide is furthered by the presence of an alkali metal compound, such as an alkali metal salt. The carbide thus formed will also decompose water under the formation of nascent hydrogen.

Further means for the control of the decomposition reaction of the carbonaceous materials comprises the addition of elementary sulphur or a sulphur compound of iron, nickel, cobalt, tin or uranium.

This feature of my invention is illustrated by the following example:

*Example 4*

100 parts of the aforementioned topped crude are treated at 475° C. and under a pressure of 300 atms. with 100 parts of spongy iron reduced at 800° C., 3.5 parts of nickel sulfide, 2 parts of sulphur and 45 parts of an aqueous solution containing 3% of magnesium chloride and 1% of chromium chloride. There are formed 102% by volume of a hydrogenation product containing 50% gasoline, 3.7% by weight of the oil treated having been converted into gas.

The high boiling fractions of the hydrogenation products may be subjected to a repeated treatment or may serve for the conversion into lubricating oils or may be utilized in some other manner, for example for the production of solvents and the like, or they may be subjected to a cracking, coking or gasification process. If the above mentioned high boiling fractions of the hydrogenation products are to be utilized for the production of lubricating oils, the operating conditions for the process above described may have to be modified. Thus the temperature in the reaction zone may be lowered by approximately 15 to 20° C.; further the time of reaction may be prolonged, whereby the yield of gasoline may be considerably decreased.

In the drawings affixed to this specification and forming part thereof, I have shown diagrammatically by way of example an apparatus for carrying out the process of the invention.

Fig. 1 being a diagram showing the combination of devices used, while

Fig. 2 is a vertical cross section of a reaction vessel as described hereafter.

Referring to the apparatus illustrated in Fig. 1, 1 is a hopper for the introduction of finely divided metal, such as iron, while the initial material to be hydrogenated is charged through a pipe 2 and an aqueous solution through a pipe 3 into a mixer 4 provided with stirring means. 5 is a pump forcing the fluid mixture from the mixer 4 to the high pressure system, conveying it through the heat exchanger 7 into the reaction vessel 8. The mixture enters the reaction vessel at the top at 9 and escapes at the bottom thereof at 10. The reaction vessel is provided with agitating means 11. The hydrogenated material leaving the reaction vessel may be caused to exchange heat with the fresh material to be hydrogenated in the heat exchanger 7 and then flows through a pressure releasing device 12, comprising a cylinder and a piston. The mixture is admitted to said cylinder after a pressure has been established therein, which is equal or nearly equal to the pressure on the mixture in the reaction vessel. The piston is then moved at a speed low enough not to bring about an unduly high velocity of flow of the mixture entering said cylinder. The inlet valve of the releasing device 12 is then closed and the pressure on the mixture in the cylinder is released partly or completely, and a portion of the mixture contained in said cylinder is allowed to discharge therefrom. Thereupon, after the outlet valve of the releasing device has been closed, the portion of the mixture remaining in the cylinder is recompressed to the initial high pressure by means of the piston and then another portion of the mixture issuing from the reaction vessel under high pressure is admitted to the cylinder. The contents of said cylinder are now again allowed to expand and discharge and so on. Thus, the high pressure prevailing in the reaction system is reduced in the pressure releasing device to a considerably lower pressure, for example to about 20 atms. or even to atmospheric pressure. The reaction mixture passes from the releasing device 12 into a separator 13, a water cooler (not shown) being, if desired, inserted between said pressure releasing device and said separator. Gaseous and vaporous constituents escape from the separator at 14, passing through a cooler 15 to another separator 16. Liquid constituents may be withdrawn from the separator 16 through valve 17 and may be conducted to a distillation plant. The gaseous constituents leaving the separator 16 through a pipe 18 may be utilized in the reduction of the metal oxides or may be withdrawn from the system. Liquid products leaving the separator 13 through valve 19 may pass through a heat exchanger 20 and may be separated in a centrifugal 21 into solid and fluid constituents, the latter being conducted to a distillation plant. The solid constituents removed from the centrifugal 21 may be mixed in a device 22 with water or a middle oil and subjected to a separation treatment in a separator 23, for example in a filter press. If the solid mass fed to the device 22 is stirred therein with water, salts which may be present will be dissolved and may be recovered for further use. An intermediate fraction may be separated out in the separator 23, which fraction may be passed to the distillation plant, while the residue from the separator 23 is heat treated in a device 24 to be freed from any remanent oil. The solid substances substantially comprising metal oxides are transferred from the heat treating device 24, for example by means of a conveyer 25, into the reduction oven 26, which may be fitted with scrapers or stirring devices. In this oven 26, the material comprising the metallic substances to be reused in the hydrogenation process is treated at an elevated temperature of, for example about 800° C. with a reducing agent, such as a reducing gas, in such manner that reduced metal can be collected preferably in the form of a powderous product issuing from the reducing oven 26. Such reduced metal may be returned by any suitable means, such as the conveyers 27, 28 and 29, to the hopper 1 to be reused in the process.

Fig. 1 also illustrates a manner in which residual or intermediate fractions resulting from the hydrogenation may again be subjected to hydrogenation within the process. To this end, a portion of the reduced metal or metals is conveyed through the hopper 30 to the mixer 31, into which also the fractions to be re-treated are passed through a pipe 32, water being fed through pipe 33. A pump 34 serves for conveying the resultant mixture from the mixer 31 to any desirable point of the reaction zone, for example to a place indicated at 35 of the reaction vessel 8.

Hydrocarbons containing sulphur or aromatic hydrocarbons, or hydrocarbons boiling at relatively high temperatures, such as coal tar, naphthalene or the like, are preferably first heated for a certain time at reaction temperature together with the metal in absence of water so that, at first, no appreciable hydrogenation will take place. This preliminary treatment of the starting material before the action of water on the finely divided metal influences said hydrocarbons in such manner that they will be more adapted for subsequent hydrogenation.

*Example 5*

10 parts of a German brown-coal tar boiling above 300° C. and containing about 35% of phenols are preheated together with 10 parts of a spongy molybdenum-iron mixture containing some carbon, and are then introduced through the inlet 9 into a vertical reaction vessel 8 provided with a stirring device such as shown in Fig. 1. 3.5 parts of an aqueous solution containing 3% of calcium chloride and 0.5% of uranyl chloride are also preheated and separately introduced through a pipe 3, valve 3a being closed, into the reaction vessel 8 at a point indicated by the numeral 37. The tar oil is thus subjected in the reaction vessel to heat treatment followed by hydrogenation at 465° C. and 300 atms. The hydrogenation products withdrawn from the bottom part of the reaction vessel will contain the following: 29.3% by volume of gasoline boiling up to 220° C., 55.1% of a middle oil fraction boiling between 220 and 360° C., and 15.6% of a residue boiling above 360° C. The percentage of phenols in these three products is 4% in the gasoline, 5.6% in the middle oil and 6.2% in the residual product. The contents of phenols have thus dropped from 35% in the starting material to 5.23% in said products of hydrogenation. The contents of aromatic products in the gasoline was found to be as high as 28%.

If a coal tar fraction, 60% of which consists of oxygen compounds, such as cumaron or cumaron resins, is similarly subjected to heat treatment and hydrogenation at approximately 460° C. under a pressure of about 300 atms.; there are obtained about 50% by volume of a gasoline containing about 55% benzene. The residue having an initial boiling point of 180° C. may again be subjected to the same process. In this example a small amount of water may be fed to the mixer 4 through valve 3a, the required amount of water being, however, mainly introduced into the reaction vessel 8 by means of the pump 36 and through a preheater (not shown).

In order not to carry the heat treatment prior to the hydrogenation so far that any material quantities of gas and coke would be formed, care must be taken to provide for a supply of hydrogen in proportion to the increasing decomposition of the starting material. Therefore, while in the cases of certain types of carbonaceous materials referred to above the metals are allowed to act first on the hydrocarbons in the absence of substantial amounts of water and nascent hydrogen, a sufficient quantity of such hydrogen must be supplied to the products forming in the decomposition as soon as such decomposition of the carbonaceous materials is materially effected. This object may be attained by bringing the carbonaceous starting material together with the metals or other substances which are to act on the water, into countercurrent flow with the water in the reaction zone.

This countercurrent treatment is preferably carried out by feeding oil or other carbonaceous material to be hydrogenated together with metal, such as iron, and a promoter (salt) and, if desired, also hydrogenation catalysts, to the top part of a reaction vessel, for instance of the kind shown in Fig. 2, the mixture being fed to the vessel 38 through pipe 39. The reaction vessel 38 may preferably be provided with stirring or agitating means 40, and the mixture passes downwardly through said vessel. Water, preferably preheated by heat exchange with the products leaving the reaction vessel and further heated in any suitable manner, may be introduced into the lower part of the reaction vessel 38 through pipe 42 and pipes 43, 44 or 45 controlled by valves. Gases formed in the treatment may be removed from the vessel 38 together with vaporous reaction products through pipe 46.

Water will react in its upward passage through the reaction vessel with the descending iron so that in the top part of the reaction vessel substantially only a mixture of vapors and gases will collect. The metal particles arriving at the lower part of the vessel in a largely oxidized condition are there completely oxidized on account of the supply of the water entering this part of the vessel.

In such operation, there is no need for supplying materially more than the stoichiometric quantity of water.

The heat stored in the products which escape at 41 and 46 may be fully utilized by heat exchange for preheating the substances to be hydrogenated and the water. A pressure releasing device of the kind described above may be used as well as the usual apparatus for separating gaseous from liquid and solid constituents and for separating solid particles from liquid hydrogenation products.

Furthermore, metal oxides which have been separated from the hydrogenation products, may be reduced in such apparatus as has previously been referred to with the aid of gases or carbon or both and, if desired with simultaneous regeneration of catalysts.

With further reference to the correlation of the reactions involved in the hydrogenation process of the invention, it has been found advisable in the treatment of more difficultly hydrogenatable carbonaceous materials, such as hydrogenation or other residues, and high boiling hydrocarbons, such as asphalts or phenolic tars and the like, to regulate the rate of generation of nascent hydrogen in such manner that the generation of nascent hydrogen slightly precedes the decomposition of the hydrocarbons undergoing treatment, whereby the yield of desired valuable products may be considerably increased. Such preceding of hydrogen generation, however, results in an increase of the relatively small content of molecular hydrogen in the resultant gases of the process of the invention. Such conditions may be illustrated by the following example.

*Example 6*

10 parts by weight of a brown-coal tar recovered in the low temperature carbonization of Hungarian brown-coal, which tar contains 5.5% of sulphur and 15% of water in the form of an emulsion, are subjected to hydrogenation at a temperature of about 455° C. and under a pressure of 320 atms. with 10 parts by weight of spongy iron containing chromium, nickel and carbon and with 3.5 parts by weight of an aqueous solution containing 2.5% of magnesium chloride, 1.5% of cerium chloride and 0.1% of uranyl chloride. After the mixture of said materials has been brought to the proper operating conditions of pressure and temperature, two additional parts by weight of tar are added thereto, whereby the percentage of iron is lowered correspondingly. With a yield of 96% by volume of liquid products, calculated on the basis of carbonaceous starting material alone, said liquid hydrogenation products contain 45% by volume of gasoline boiling up to 220° C., 38% of a middle oil boiling between 220 and 360° C. and 17% of a residual product boiling above 360° C. The content of sulphur has dropped from 5.5% in the starting material to 0.08% in the whole of the liquid hydrogenation products. The residual gas, obtained after removal of hydrocarbon gases contains 88% of hydrogen.

Natural emulsions of crude oil may be treated in a similar manner with great advantage, particularly inasmuch as the amount of water present in such emulsions compensates in part or all the water requirement of the process.

In the hydrogenation of sulphur containing carbonaceous materials, such as residues from Texas crudes or brown-coal tars of the type referred to in Example 6, the sulphur largely combines with the metals used in the process of the invention to form metal sulfides. In order to prevent a gradual increase of the sulphur content in the metallic substances added and reused in the process, the metallic substances when largely in the state of metallic oxides and before their reduction may be subjected to a closely controlled treatment with oxygen, or gases containing oxygen, at elevated temperature. By such oxidation treatment the undesired amounts of sulphur may be removed in the form of sulphur dioxide. Such treatment may for example be carried out in the heat treating device 24 illustrated in Fig. 1, or in a separate apparatus of vertical or horizontal construction as generally known for the reduction of pyrites. Also in the application of the known types of apparatus to such oxidation treatment the removal of oily constituents or water may or may not be effected simultaneously. From the above it is evident that there is no need in the process of the invention for using hydrogenation catalysts immune to sulphur poisoning, since the sulphur present in the carbonaceous materials subjected to conversion reacts with reduced metals in preference to any catalysts that may be used, the combined sulphur being thereafter readily eliminated from the metal compounds.

Molecular hydrogen contained in or obtained from the residual gases of the process, as illustrated for instance by the Example No. 6 given above, may be used in the reduction of the metal oxides, or such hydrogen gas may preferably be re-circulated through the system, if desired, after proper purification. This re-introduction of molecular hydrogen into the reaction zone of the hydrogenation, which circulation may be effected by means of circulating pumps, offers also the advantage that the low boiling products may be more easily separated from the higher boiling fractions and the solid residues in the system, for such gas re-circulation lowers the vapor pressure of the vaporizable hydrogenated products under the prevailing reaction conditions. The separation of condensable constituents from the gaseous products may be effected by any suitable means, such as cooling.

No matter whether the carbonaceous materials are subjected to hydrogenation with nascent hydrogen produced within the reaction zone by the interaction of water in the supercritical state on metals or some other substances capable of decomposing same by the above described concurrent or countercurrent treatment, it has proved useful, whenever the starting material is not readily hydrogenatable, to force the water to be supplied into different parts of the reaction zone. Similarly, the metal or metals may be introduced at different points of the vessel. I have found that, by such procedure, I am enabled to exert a far reaching influence on the velocity of formation of nascent hydrogen at different points of the reaction zone, particularly if varying proportions of water and metal are injected at various points of said zone.

Carbonaceous starting materials which can be hydrogenated only with difficulty, are preferably subjected to the hydrogenation treatment in the presence of an excess of hydrogen, that is to say an excess of water and metal. However, the formation of such an excess of nascent hydrogen in a relatively small part of the reaction zone might tend to cause a local superheating since the reaction between metal and water and especially between zinc and water is strongly exothermic. If, however, the water is brought in small portions into contact with the mixture of oil and metal at different parts of the reaction zone, a uniform distribution of the heat of reaction in all parts of said zone will be obtained, so that any rise of temperature, caused by exothermic reactions will occur within reasonable or normal and easily controllable limits.

When proceeding in the manner just described, I have also found it advisable to supply higher boiling hydrocarbon fractions from the process itself or from another source of those parts of the reaction zone in which higher temperatures prevail, inasmuch as such heavy oil fractions are advantageously subjected to the hydrogenation treatment at higher temperatures.

If starting materials requiring relatively small amounts of hydrogen for hydrogenation are to be treated, the supply of water at different points of the reaction zone will be found useful. For if in such case the whole of the water required in the reactions were introduced into the reaction zone together with the carbonaceous material and metal, the exothermic reaction between the metal and the water would create a high temperature near the inlet of the reaction zone, while a drop of temperature would take place in consequence of the diminution of the reaction resulting in the formation of nascent hydrogen at points remote from said inlet or near the outlet of the reaction zone, where a rise of temperature might be desirable.

If water is introduced into the reaction zone in a plurality of separate streams, and if the starting materials require only little hydrogen for hydrogenation, any additional heat required for the reactions in the reaction zone may be supplied by providing the water in a highly preheated supercritical state, whereby separate means for heating the reaction zone may not be needed and the reaction temperature may be regulated by simple means in all parts of the reaction zone.

In speaking of water in the supercritical state or condition I refer to the state in which water presumably exists under the conditions of reaction, i. e. at a temperature of about 450° C. and under a pressure of about 200 atms. or more.

In Ullmann's "Enzyklopädie der technischen Chemie" 2nd edition, vol. 6, pp. 812 to 813, the critical temperature of a solid or fluid material is defined as being the temperature at which the solid or liquid can only exist in the gaseous phase and the vapor tension of a liquid at its critical temperature is defined as the critical pressure. The critical temperature of pure water is given in said publication as 374° C. and the critical pressure as 218 atms., while other investigators have reported critical data for pure water which vary slightly.

Obviously, the desired reactions between water and metal resulting in the generation of nascent hydrogen and between nascent hydrogen and the material to be hydrogenated proceed within the fluid mixture, comprising the carbonaceous material to be hydrogenated, water preferably in the form of an aqueous solution of salts and solid metal particles. Fluid mixtures of this kind, when heated under conditions of temperature and pressure approaching or surpassing the critical conditions exihibit peculiar phenomena, such as for instance the formation of stable foams. In this supercritical state, water appears to be particularly reactive and therefore seems to form nascent hydrogen by reaction with the metal present with such velocity of reaction that sufficient quantities of nascent hydrogen can be made available at the proper time for combination with the products forming in the decomposition reaction of the carbonaceous material.

Various changes may be made in the details disclosed in the foregoing specification without departing from the invention or sacrificing the advantages thereof. The term "substance capable of promoting a reaction" as used in the appended claims is intended to include promoting substances which remain unaffected by the reaction, as well as promoting substances which undergo a change under the conditions of reaction.

I claim:—

1. In the conversion of carbonaceous materials containing sulfur to form lower boiling hydrocarbon oils wherein such a carbonaceous material is passed into a closed reaction zone in the presence of water and of at least one finely divided metal capable of reacting with said water with the production of nascent hydrogen in situ and wherein said reaction zone is heated to temperatures above the critical temperature of water and is maintained at pressures above the critical pressure of water, thereby producing the liberation of nascent hydrogen from the water and building up within the reaction zone a self-generated pressure adequate for the hydrogenation and sufficient to prevent substantial vaporization of the carbonaceous material; the improvement which comprises recovering the solid reaction products containing metal oxides and sulfides, heating and oxidizing the same to remove any sulfur contained therein, reducing the resulting metal oxide without sintering and returning the reduced metal to the process.

2. A process for converting carbonaceous materials into lower boiling hydrocarbon oils which comprises introducing an unsintered spongy iron product, formed by the reduction of ferric oxide by reducing agents at temperatures not substantially exceeding 1000° C., with water and a carbonaceous material into a closed reaction zone, the proportions of the iron product and water being such as to react at elevated temperature with the liberation of sufficient hydrogen to hydrogenate a substantial portion of the carbonaceous material during its conversion into lower boiling oils; subjecting the mixture of carbonaceous material, iron and water in the closed reaction zone to a temperature above the critical temperature of water and a pressure above the critical pressure of water and building up within said reaction zone a self-generated pressure adequate for the hydrogenation of said carbonaceous material and sufficient to prevent substantial vaporization of the carbonaceous material; and retaining the said mixture under the elevated temperature and pressure in said reaction zone for a sufficient time to produce said lower boiling oils by reaction between the liberated hydrogen and carbonaceous material.

3. The process of claim 2 wherein said unsintered spongy iron is produced by reducing the spent iron oxide recovered in the process by means of reducing gases and carbon.

THEODOR WILHELM PFIRRMANN.